United States Patent
Sloane et al.

(10) Patent No.: US 6,434,530 B1
(45) Date of Patent: Aug. 13, 2002

(54) INTERACTIVE SHOPPING SYSTEM WITH MOBILE APPARATUS

(75) Inventors: Martin A. Sloane, Boca Raton, FL (US); Tod Bogan, Camillus, NY (US)

(73) Assignee: Retail Multimedia Corporation, Boca Raton, FL (US)

(*) Notice: Subject to any disclaimer, the term of this patent is extended or adjusted under 35 U.S.C. 154(b) by 0 days.

(21) Appl. No.: 09/233,825

(22) Filed: Jan. 20, 1999

Related U.S. Application Data

(63) Continuation-in-part of application No. 08/655,478, filed on May 30, 1996, now Pat. No. 5,918,211.

(51) Int. Cl.$^7$ .............................................. G06F 17/60
(52) U.S. Cl. ............................. 705/1; 705/16; 235/383
(58) Field of Search ............................... 705/14, 16, 1; 704/275; 706/22; 235/375, 383

(56) References Cited

U.S. PATENT DOCUMENTS

| | | | | |
|---|---|---|---|---|
| 3,792,437 A | * | 2/1974 | Blumenthal et al. | 340/152 |
| 4,723,212 A | | 2/1988 | Mindrum et al. | 705/14 |
| 4,780,599 A | * | 10/1988 | Baus | 235/383 |
| 4,882,724 A | * | 11/1989 | Vela et al. | 705/14 |
| 4,910,672 A | | 3/1990 | Off et al. | 705/14 |
| 5,047,614 A | | 9/1991 | Bianco | 235/385 |
| 5,173,851 A | | 12/1992 | Off et al. | 705/14 |
| 5,237,157 A | * | 8/1993 | Kaplan | 235/375 |
| 5,250,789 A | | 10/1993 | Johnsen | 705/14 |
| 5,361,871 A | | 11/1994 | Gupta et al. | 186/61 |
| 5,424,524 A | | 6/1995 | Ruppert et al. | 705/8 |
| 5,457,307 A | | 10/1995 | Dumont | 235/383 |
| 5,583,487 A | | 12/1996 | Ackerman et al. | 340/5.91 |
| 5,595,264 A | | 1/1997 | Trotta, Jr. | 186/56 |
| 5,630,071 A | | 5/1997 | Sakai et al. | 705/21 |
| 5,637,847 A | | 6/1997 | Watanabe | 235/383 |
| 5,729,697 A | | 3/1998 | Schkolnick et al. | 705/23 |
| 5,739,513 A | | 4/1998 | Watanabe | 235/383 |
| 5,774,860 A | * | 6/1998 | Bayya et al. | 704/275 |
| 5,850,187 A | * | 12/1998 | Carrender et al. | 340/825.54 |
| 5,887,271 A | * | 3/1999 | Powell | 705/14 |
| 5,897,622 A | * | 4/1999 | Blinn et al. | 705/26 |
| 5,918,211 A | * | 6/1999 | Sloane | 705/16 |
| 5,979,757 A | * | 11/1999 | Tracy et al. | 705/14 |
| 6,021,403 A | * | 2/2000 | Horvitz et al. | 706/45 |
| 6,032,126 A | * | 2/2000 | Kachler | 705/16 |

FOREIGN PATENT DOCUMENTS

JP 2001236401 * 8/2001

OTHER PUBLICATIONS no author; Expert system gain expertise; at publix, Al broadens knowledge base; Mar. 1990; Chain Store Age Executive with Shopping Center, v66, n3, p51(4); dialog copy pp. 1–3.*

May, Kenneth, "The Next Wave in Al", Best's Review, v92n6, pp: 118–127, Oct. 1991.* http://drlink.mnis.net/docs/help–index.html, 1998.*

* cited by examiner

Primary Examiner—Hyung Sub Sough
Assistant Examiner—Thomas A. Dixon
(74) Attorney, Agent, or Firm—Akerman Senterfitt

(57) ABSTRACT

An interactive system adapted for use in a shopping venue, comprises: an interactive and intelligent source of information, for example supplemental information related to articles available for selection by shoppers in a shopping venue, and not otherwise available to the shoppers during shopping; and, a plurality of interactive, mobile apparatus which shoppers can move throughout the shopping venue and use for transmitting queries to the interactive source of information and use for receiving information transmitted from the interactive source of information, whereby shoppers can receive information useful for evaluating the articles when making article selection decisions, and at least some of the received information can be formulated to influence the article selection decisions. At least some of the information transmitted to the shoppers can be responsive to the queries. An artificial intelligence unit can evaluate the queries and select information for inclusion in responses to the queries.

33 Claims, 3 Drawing Sheets

INTERACTIVE SHOPPING SYSTEM WITH MOBILE APPARATUS

CROSS REFERENCE TO RELATED APPLICATIONS

This application is a continuation-in-part of patent application Ser. No. 08/655,478 filed on May 30, 1996 now U.S. Pat. No. 5,918,211.

BACKGROUND OF THE INVENTION

1. Field of the Invention

The invention relates generally to the fields of shopping and advertising, and in particular, to an interactive shopping system which can provide shoppers with useful product information for assisting the shopper at the time and place of article selection, and which can also provide promotions and discounts from a marketing and advertising campaign targeted for influencing the shoppers' choices at the time and place of article selection.

2. Description of Related Art

When a shopper is shopping, usually but not always in the aisles of a store, there is presently no effective way to answer the shopper's request for product information of particular interest to that shopper. The moment at which a shopper is most likely to recognize a need for product information is during the shopping experience. More specifically, the moment occurs when the shopper is at the point-of-purchase, for example standing in an aisle at a particular retail establishment and physically looking at an article of merchandise, and deciding whether or not to purchase the article under scrutiny. As a practical matter, that ultimate shopping question is presently a rhetorical question. No person or mechanism is available to supply article specific information which can assist the shopper in deciding whether or not to purchase the article. From a marketing viewpoint, there is no opportunity to influence the shopper's decision at the moment the decision is being made.

Product information available in stores is typically printed somewhere on the product package, often in small hard-to-read print. On-package information has the drawback of being general in nature and not specific to the shopper's need for information. Product information can, to some degree, appear on shelf signs. This kind of information device suffers from being limited in the information it can provide and in not providing the specific information the shopper may require. Compounding the problem of lack of information is the difficulty and the amount of time required to marshal information from several sources, for example packages and shelf signs, to make product comparisons. In a grocery store, for example, comparisons of price, ingredients and recipe preparation time can be required.

Thus, the shopper in need of information is forced to go on a time-consuming hunt, checking labels, reading fine print, trying to remember price or other information and often not finding the desired information or being unable to make an important product comparison.

Providing specific information requested by shoppers as they walk through a store or stand at the point-of-purchase, is a problem for manufacturers. Manufacturers would like to take advantage of a request for information to offer the shopper not only product information, but product benefits that specifically relate to the needs of a particular shopper and can induce the shopper to select one product over another product. In addition, manufacturers would like to use a shopper request for information as an opportunity to provide product promotion information, such as a discount, that will motivate a purchase of the product. The manufacturer may want to access the purchase history of the shopper in order to determine the value of the discount, which is also a problem. In addition, manufacturers would like to draw from data bases of shopper specific information to intelligently address the needs of specific shoppers for a wider range of information that can be delivered at the point-of-purchase, such as requested meal planning advice. Current art for providing this requested information at the point of purchase does not exist.

Manufacturers recognize that providing information at the point-of-purchase is important for the opportunity afforded the manufacturer to impact on or alter shopper purchasing behavior. The most widely used in-aisle information device is the red Smart Source "Take ONE" information dispenser from News America Marketing (formerly ActMedia), which is now attached to shelves in thousands of retail stores. This mechanical dispenser is used to distribute recipes, product use information and shopper promotions printed on small pieces of paper pulled from the machine by interested shoppers. This method for providing product information is limited as a result of the restrictions in the number of dispensers that can be placed in each store. This method is also limited in the amount and type of information that can be provided to the shopper. Most importantly, this method cannot respond to specific requests for information nor can it tailor information based on shopper's expressed preferences or purchase history.

Accordingly, there is long-felt need to provide shoppers with the kind of supplemental information required to make intelligent shopping decisions at the times such decisions are being made. Moreover, there is a long-felt need for manufacturers to influence shopping decisions at the time the decisions are being made. Historically, these needs have been perceived by those skilled in the related arts to be contradictory at best, and this perception may be the reason that the needs have not heretofore been reconciled in any practical fashion.

SUMMARY OF THE INVENTION

Interactive shopping systems in accordance with the inventive arrangements provide shoppers with the kind of supplemental information required to make intelligent shopping decisions at the times such decisions are being made and enable manufacturers to influence shopping decisions, for example with price and/or product advisories, at the time the decisions are being made. Shoppers can benefit from the supplemental information even though manufacturers are benefitting from the opportunity to influence the purchasing decisions. Manufacturers can benefit from the cost efficiencies of targeting shoppers and influencing purchasing decisions at the time of purchase, even if the supplemental information sometimes induces shoppers to select another article. Greater efficiency in advertising can result in lower prices and more competition. Shoppers and manufacturers can both benefit, thus for the first time reconciling the long-felt and contradictory needs of the prior art.

In accordance with the inventive arrangements, shoppers can carry an interactive apparatus throughout a shopping venue for communicating with an interactive and intelligent source of supplemental information not otherwise available to the shopper in the shopping venue.

An interactive system adapted for use in a shopping venue, in accordance with the inventive arrangements, comprises: an interactive source of supplemental information, related to articles available for selection by shoppers in a shopping venue, and not otherwise available to the shoppers during shopping; and, a plurality of interactive, mobile apparatus which shoppers can move throughout the shopping venue and use for transmitting queries to the interactive source of supplemental information and use for receiving information transmitted from the interactive source of supplemental information, whereby shoppers can receive information useful for evaluating the articles when making article selection decisions, and at least some of the received information can be formulated to influence the article selection decisions.

At least some of the supplemental information transmitted to the shoppers can be responsive to the queries.

The shopping system can further comprise: a speech interface operatively associated with each the apparatus; and, a speech application enabling the queries to be spoken and enabling the transmitted supplemental information to be audibly perceived.

The system can further comprise means for communicating with a point of sale system (POS) associated with the shopping venue. The information supplied to the shopper can include at least some information from the POS system.

The system can further comprise: a base station for housing the interactive source; respective transceivers disposed in the apparatus and the base station for communicating data to one another; and, respective processors for controlling the apparatus and the base station.

At least some of the information in the at least one supplemental data base can be related to personal shopping preferences transmitted to the base station by operation of each apparatus.

The system can comprise at least one of: a speech user interface for receiving spoken queries and commands and supplying audible responses; and, a graphical user interface having a display screen and a tactilely activatable input. The speech user interface can comprise at least one of: a microphone and a speaker built into the apparatus; and, a headset having a microphone and a speaker. The tactilely activatable input can comprise at least one of: a touch display screen; and, an array of buttons.

The system can further comprise an artificial intelligence unit for evaluating the queries and selecting information for inclusion in responses to the queries.

The system can further comprise a speech application. The speech application can comprise a speech recognition engine and a text-to-speech engine.

The apparatus can further comprise a bar code scanner. The apparatus can be adapted for selectively mounting on a shopping cart and for being carried by the shopper.

The system can further comprise a plurality of the mobile interactive apparatus adapted for storage in a rack, the apparatus being adapted for the mobile use upon selective removal from the rack.

The system can further comprise a rack for storing a plurality of the mobile interactive apparatus, each apparatus being adapted for the mobile use upon selective removal from the rack.

The at least one supplemental data base can include video data; and, the at least one user interface can comprise a screen for displaying the video data. The shopping venue can be associated with video cassettes; and, the video data can include trailers for movies. The shopping venue can be associated with building supplies; and, the video data can include building projects. The shopping venue can be associated with groceries; and, the video data can include prepared foods. The shopping venue can be associated with automobiles; and, the video data can include automobiles. The shopping venue can be associated with a merchandiser; and, the video data can include merchandise.

The artificial intelligence unit can generate, for example, one or more of the following: a shopping list responsive to an audible customer query; warnings when values of data in the information supplied to the shopper for shopper-selected articles is out of a predetermined range; price and/or price advisories based on shopper-selected articles; and, a tutorial running concurrently and intermittently with selection of the articles. Parts of the tutorial can be initiated by scanning the articles.

The system can further comprise a help desk station accessible by use of the mobile apparatus in the shopping venue.

The system can further comprise one or more of: first means enabling communication between the interactive source and the rack; second means enabling communication between the interactive source and a point of sale system (POS) associated with the shopping venue; and, third means enabling communication between the interactive source and a source of the received information formulated to influence the article selection decisions.

The artificial intelligence unit can also generate at least one of price and product advisories based on proximity to an article.

Another interactive shopping system, in accordance with the inventive arrangements, comprises: an interactive and intelligent source of information related to articles available for selection by shoppers in a shopping venue; and, a plurality of interactive, mobile apparatus which shoppers can move throughout the shopping venue and use for transmitting queries to the interactive and intelligent source of information and use for receiving information transmitted from the interactive and intelligent source of information, whereby shoppers can receive information useful for evaluating the articles when making article selection decisions, and at least some of the received information can be formulated to influence the article selection decisions.

The interactive and intelligent source of information can comprise an artificial intelligence unit, for example a neural network, for evaluating the queries and selecting information for inclusion in responses to the queries.

The system can comprise at least one of: a speech user interface for receiving spoken queries and commands and supplying audible responses; and, a graphical user interface having a display screen and a tactilely activatable input.

The shopping system can further comprise: a speech interface operatively associated with each the apparatus; and, a speech application enabling the queries to be spoken and enabling the transmitted supplemental information to be audibly perceived.

The system can further comprise: a rack for storing a plurality of the mobile interactive apparatus, each the apparatus being adapted for the mobile use upon selective removal from the rack.

The system can further comprise at least one user interface. The information can include video data and the at least one user interface can comprise a screen for displaying the video data.

BRIEF DESCRIPTION OF THE PREFERRED EMBODIMENTS

DETAILED DESCRIPTION OF THE DRAWINGS

Figure 1:
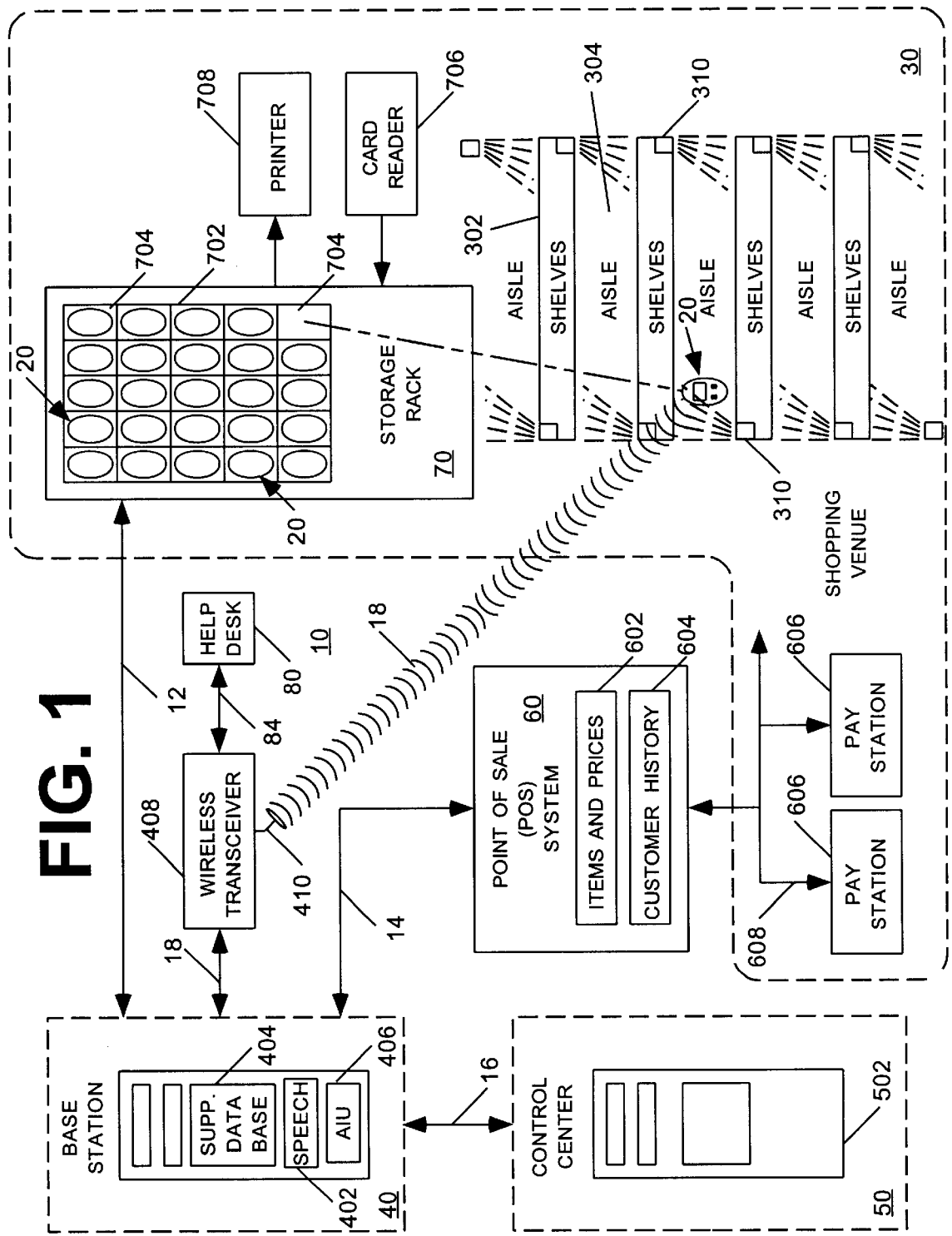
FIG. 1 is a block diagram of an interactive shopping system in accordance with the inventive arrangements.

An interactive shopping system 10 is shown in block and diagrammatic form in FIG. 1. The system 10 comprises a plurality of mobile interactive apparatus 20 adapted for use throughout a shopping venue 30. Each mobile apparatus, which in many cases will be an in-aisle apparatus, can be a multimedia device, providing audible and visual outputs, and accepting shopper inputs. Accordingly, each apparatus 20 is a mobile multimedia interface for the interactive shopping system. The visual outputs can be character displays, pictures, video and video playback. Each mobile apparatus 20 is controlled by a base station 40, which can itself be controlled by a control center 50. The system 10 is adapted for use with a point of sale (POS) system 60.

The shopping venue 30 is intended to represent any sales or exhibition arena, including but not limited to retail and wholesale stores, in which articles for sale are displayed. In most cases, the shopping venue displays the articles on shelves 302 which define a plurality of aisles 304 between them. The shelves can also represent bins, racks and other structures for presenting articles to the shoppers. A shopper typically pushes a shopping cart through the aisles, moving products from the shelves into the cart. In some cases, the aisles can be defined by rows of vehicles in an automobile dealership or a car show, or by rows of boats in a marine vehicle dealership or a boat show. In a floating boat show, the aisles are the docks.

The POS 60 also interacts directly with the shopping venue 30, communicating with one or more pay stations 606 through a communications network 608. The pay stations 606 can be embodied as computer work stations on a local area network (LAN). The POS 60 is typically provided with a first data base 602 containing item and price data for all articles sold in the shopping venue. The POS 60 is also typically provided with access to a second data base 604 for customer shopping histories. The customer shopping history data base 604 often resides in a central location for a chain store, for example corporate headquarters, but for purposes of convenience, is associated with the POS 60 in FIG. 1. The data bases 602 and 604 can communicate with, or form part of an inventory control system, not shown, in which article inventory is continuously updated as articles are checked out at the pay stations.

The interactive shopping system 10 in accordance with the inventive arrangements is particularly useful in food markets, as such a shopping venue can utilize all of the advantageous features of the shopping system. Accordingly, the inventive arrangements will be described in this context. It will be appreciated by those skilled in the art that the interactive shopping system 10 can be used with the widest variety of articles and shopping venues. Other kinds of shopping venues which are considered in part in the following description include building supplies, video rentals and automobile dealers.

The shopping venue 30 is provided with a storage rack 70 for holding each mobile interactive apparatus 20 when not being used by a shopper. The rack 70 comprises an array 702 of locations 704, each of which is provided with an interface, not shown, for establishing data communications between the rack 70 and each apparatus 20, as well as for establishing data communications between each apparatus 20 and the base station 40. The base station 40 and the rack 70 communicate with one another over communications link 12. Communications between each apparatus 20 and the base station can be made directly, or can be made indirectly through the rack 70, depending upon the nature of the communications devices and the nature of the communications links. These details are not a basic aspect of the inventive arrangements and are omitted for purposes of clarity. It can be said, generally, that the rack 70 can be provided with a processor, in the nature of a personal computer and the like, and as such be part of a LAN which includes the base station 40, the POS 60, and optionally, the control center 50. The nature of such LANs is well known to those skilled in the art. The rack 70 can receive input data from a card reader 706 and can supply output data to a printer 708, each of which can be mounted integrally with the rack, or can be mounted elsewhere or free standing in relatively close proximity to the rack.

The card reader 706 can be used by shoppers to "check out" an apparatus 20 from the rack prior to use. The card can be a credit card or a special card issued by the merchant managing the shopping venue. The base station 40 initializes the system 10 for that particular user in response to the data communicated from the rack, and can implement special procedures if the shopper is using the apparatus 20 for the first time. The printer 708 can be used, for example, to provide the shopper with one or more coupons to use while shopping, or to provide itemized store receipts.

The base station 40 is provided with a wireless transceiver 408 having an antenna 410. The base station can communicate with the wireless transceiver 408 through a communications link 18. The wireless transceiver 408 can communicate with a help desk station 80 through a communications link 82. Different frequencies can be used to communicate with respective apparatus 10, or other multiplexing data transmission schemes can be employed. Many suitable multiplexing schemes are known and need not be described herein in detail. Each base station is provided with a supplemental data base 404, an artificial intelligence unit (AIU) 406 and a speech application 402. The data base is supplemental with respect to the data bases of the POS 60. In the context of food, for example, supplemental data base 404 can include nutritional and dietary information for all of the articles in the items and prices data base 602, enabling shoppers to be guided in their purchases based on this information, as well as price information. As will be explained in detail hereinafter, shoppers can use the apparatus 20 to submit queries to the base station while shopping and to receive answers to the queries from the base station. The queries and answers can be submitted and received by using a display screen, buttons and a touch screen overlay. The queries and answers can also be submitted and received by voice, through a microphone and speaker, or a headset. Queries and answers can thus be made and received openly, or privately through the headset, depending upon each shopper's perceived need for privacy.

The artificial intelligence unit 406 operates with the speech application 402 to process voice inputs and initiate formulation of a response by a processor in the base station, for example based on data in the POS 60 and data in the supplemental data base 404. The speech application 402 includes a speech recognition engine for converting audible information into a form suitable for processing by the AIU 406 and includes a text-to-speech engine for generating an audible response. At present, the processing power needed to process speech bidirectionally, and the processing power needed to support the AIU requires greater resources than can be conveniently or efficiently built into each apparatus 20. Accordingly, in the presently preferred embodiment, the AIU 406 and the speech application 402 are substantially if not fully contained within the base station 40. As processors continue to become ever more powerful, or smaller, or both, functions of the AIU 406 and speech application 402 can be distributed into each of the mobile apparatus 20. Upon such distribution, and in conjunction with larger local data bases, many of the shopper queries, if not all of the shopper queries, can be answered without communicating with the base station. In any event, it is the use of such an AIU 406 and speech application 402 to enable a personalized audio interface with shoppers, rather than the location of the AIU 406 and speech application 402 in the system hardware, which is an aspect of the inventive arrangements.

The AIU 406 will also respond to questions and monitor data, as will be explained hereinafter in detail. One example useful for appreciating the power of the AIU 406 in general, and the power of the AIU 406 in particular to influence shopping behavior, is the generation of a recipe. The recipe can be generated on the basis of one or more of a number of factors, in including for example, on the basis of certain ingredients already selected for purchase, on the basis of a shopper's previous shopping history, or on the basis of the cost of articles used in the recipe. With respect to cost, a recipe can even be selected on the basis of the maximum cost savings of ingredients, with regard to ingredients on sale or associated with coupons. As a specific example, a shopper can request a recipe, filled by the least expensive ingredients available, for an Italian style meal including eggplant, pasta, low fat tomato sauce and fat free cheese. In this case, the requirements for low fat tomato sauce and fat free cheese can eliminate from consideration tomato sauces and cheeses which are less expensive but do not satisfy the low fat and fat free criteria. Additional ingredients which might be necessary for the recipe, for example bread crumbs, can be included in the suggested shopping list, even if those ingredients were not specified in the query. Whether or not a recommended brand of bread crumbs would be based on cost or on fat content, or both, for example, can depend upon the shopper's personal profile if no pertinent criteria are included in the query. If sufficient criteria are not available in the personal profile or in the query, the AIU 406 can make the selection based on default rules, for example, based on the shopper's choices of articles already selected during shopping. A similar procedure would be undertaken, for example, if eggs or egg substitutes were required. Moreover, the AIU 406 has access to the list of articles selected by the shopper and can determine if any of the ingredients have already been placed in the shopper's cart. Default procedures can be utilized in the absence of information in the shopper's personal profile. A neural network is especially adapted for such kinds of processing, and in the presently preferred embodiment, AIU 406 is a neural network.

Although neural networks are generally known to those skilled in the art, a brief explanation can be helpful in appreciating the action of the neural network in the interactive shopping system. A neural network is a modifiably interconnected set of active, generally non-linear, elements (usually called neurons) which accept input signals from their environment and which both return to that environment some indication of their collective response to these signals and adjust the relevant characteristics of their interconnectivity in a manner which tends to increase the network's capacity for giving unique responses to stimuli with which, by training, the network becomes increasingly familiar.

The neurons (or more properly, the processing elements (PEs) or nodes) are, depending upon the specific software or hardware network implementation, mathematical or physical entities each capable of accepting an input signal (itself usually the sum of several contributions) and producing in response thereto an output signal whose value is some function of the total input signal value.

Linking the PEs to one another are the connections or weights. Again, depending upon the specific network implementation, these are either mathematical or physical entities. The weights mediate the inter-PE communication, each weight determining the signed fraction of the signal representing the output of some source PE that will be communicated to the input terminal of some target PE. It is the sum of all the signals impinging upon a PE input terminal which is employed in computing the PE output value.

Network behavior is determined principally by the distribution of PEs, the particular form of the PE interconnectivity, and the learning rule by which alterations are made to the weight values in response to presented input and (where appropriate) output signals. Of the many possible configurations of PEs and connections, variations on one of the simplest, the multi-layer, feed-forward, perceptron network, have proved to be of perhaps the greatest general utility. In this network scheme, the PEs are typically arranged in three or more layers.

The layers of a typical feed-forward network usually include one layer referred to as an input layer, one layer designated the output layer, and one or more intermediate (or hidden) layers. In such a network, connections (the weights) are entirely unidirectional and link PEs on a given layer only to PEs on the immediately superior layer. Also characteristic is the fact that each PE on any layer is connected to all PEs on the layer immediately above it (that is, each PE on some layer receives signals only from all PEs on the layer immediately below it). PEs on the uppermost layer are usually arranged to correspond (in the simplest case) one-for-one to the properties or parameters (the dependent variables) about which the network is intended to learn. PEs on the lowermost layer are taken to correspond similarly to the independent variables on the basis of which network training is expected to take place.

In a strictly feed-forward network, there would be, by definition, no "reverse" connections. There may, however, be feedback connections (still unidirectional) from higher to lower layers. Networks employing these are generally called "recurrent". Recurrent neural networks can be more or less effective than non-recurrent networks depending upon the intended function of the network.

Training of a network of the perceptron variety can be effected in several ways. The most common of these (the so-called back-propagation-of-error method) involves presenting the input nodes with signals representing the values of the independent variables, the output node (or nodes) with signals representing expected values for the dependent variable(s), and, after evaluating the network response(s) to the inputs, using any resultant discrepancies between expected and realized output signals to effect modification of the strengths of network connections (or weights). The term "back-propagation-of-error" derives from the process by which these discrepancies are propagated in the reverse direction through the network, from top layer to bottom, to effect alterations of network weights of such magnitudes and signs as to reduce the discrepancies encountered during subsequent forward network operation. This process, when applied repeatedly, tends to reduce the overall error for all members of a training set. It should be appreciated that the network is not memorizing examples but developing a generalization from a relatively limited set of specific cases.

A neural network can be implemented by a very large scale integration (VLSI) application specific integrated circuit (ASIC). Such a neural network can be programmed with a set of weights written into the VLSI application. The weights represent the functional relationship by which the network transforms the input signals into output signals. A more complete description of neural network configurations as known to those skilled in the art is described in *Introduction to the Theory of Neural Computation*, by John Hertz et al., Lecture Notes Volume 1, Santa Fe Institute, Studies in the Sciences of Complexity, Addison-Wesley Publishing Company.

In a commercial sense, the interactive shopping system 10 can be exploited for marketing purposes and efforts to direct shopper's habits and selections with respect to articles selected for purchase. Marketing efforts can be directed not only to specific shopping venues but to specific classes of shoppers at each shopping venue, because each shopper is provided with his or her own apparatus 20 while shopping. Indeed, it would be possible to target specific shoppers. The control center 50 can comprise a controller 502, for example a personal computer and the like, which is under the control of a marketing manager, or under the control of an intermediary service provider acting on the instructions of a marketing manager. In this scenario, the control center 50 can be used to manage a plurality of base stations in a plurality of respective shopping venues.

The base station communicates with each apparatus 20 by a wireless communications link 18. The communications links must appear to be able to operate simultaneously, even if the communications are actually multiplexed, and insofar as the operation is further perceived by the shoppers, without noticeable delays due to communications traffic. Shoppers are expected to understand that some time delays can be incurred in response to complex inquiries. In any event, such time delays will be reduced, if not altogether eliminated, as the underlying communications technology improves, and as more processing power migrates to the mobile apparatus.

Figure 2:
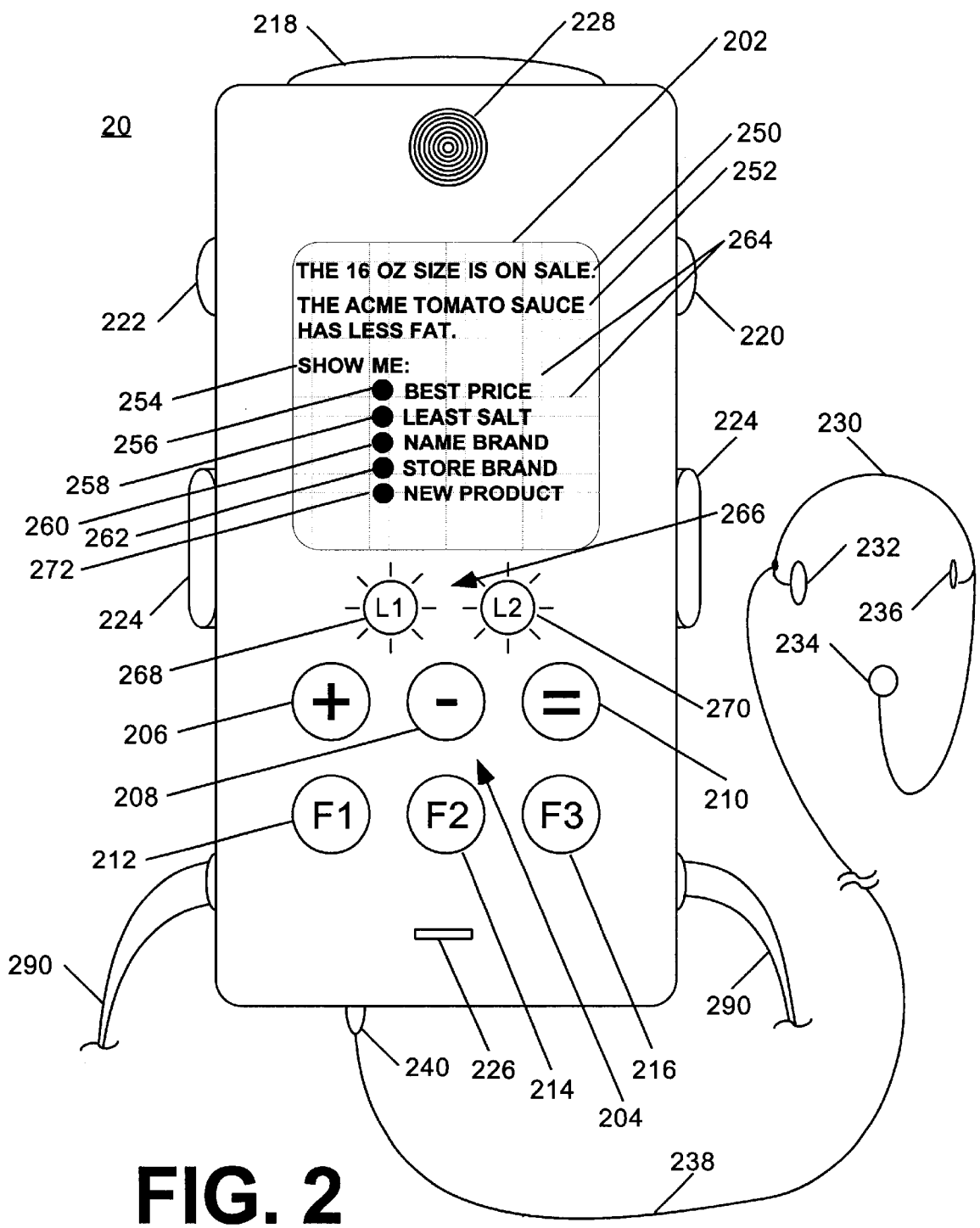
FIG. 2 is a top plan of an in-aisle interactive apparatus adapted for mobile use in the system shown in FIG. 1.

A top plan of a mobile interactive apparatus 20 is shown in FIG. 2. The apparatus is shown as being a generally rectangular box, in the nature of a typical calculator, for purposes of simplicity. Ergonomic considerations can be employed to provide appropriate contours and shapes. The apparatus 20 comprises a display screen 202 for displaying answers to queries and an array of buttons 204 for entering information or initiating certain classes of queries. Display screen 202 can, for example, be an LCD or TFT panel. Display screen 202 can be provided with a touch screen overly 264, enabling the screen to be a further input device. The array of buttons 204 includes a plus (+) button 206, a minus (−) button 208 and an equals (=) button 210. These buttons can be used, for example, in conjunction with a bar code scanner 218 to update and revise the electronic list of articles selected and scanned for purchase as such articles are placed into the shopper's shopping cart. The bar code scanner can be activated by buttons 220 and 222. Buttons 212, 214 and 216 are generically labeled for three functions F1, F2 and F3 respectively.

The at least one supplemental data base can include video data, in addition to or instead of the kind of information already described, the video data being displayable on the screen. Generally speaking, the shopping venue can be associated with one or more merchandisers, for example a mass merchandiser, and the video data can include pictures of merchandise. In the grocery shopping venue, video data can be pictures of prepared food items corresponding to recipes supplied to the shoppers. In the building supplies shopping venue, video data can be pictures of building projects, in progress or as completed or both, corresponding to lists of materials requested by shoppers.

In the environment of a shopping venue for video rentals, the screen can be used to enable shoppers to view movie trailers prior to rental. In this example, the movie trailers represent the data in the supplemental data base. From the marketing side, the exhibition of movie trailers can also be automatic and based on the shopper's rental history and user profile. A shopper might request, for example, that trailers for all new releases, or all new science fiction releases, be displayed every time the shopper checks out a mobile apparatus. In such a shopping venue, the bar code scanner can be used as the movie and movie trailer selection tool, as the shopper moves up and down the aisles. The trailers need not be as long as the trailers shown in the movies, and it is expected that versions edited for reducing length will be preferred, and thus utilized, in the shopping venues. Most trailers are not R or X rated, but the trailers can also be edited for R or X rated content, if desired. Video transmission requires more bandwidth than the kind of data and voice transmitted in other kinds of shopping venues, but the screens are small and the technology is available, if not presently economically feasible.

In the environment of a shopping venue for an automobile dealership, the mobile apparatus can enable shoppers to roam through a lot, and be supplied with information regarding cars which are scanned while roaming. Special financing arrangements and equipment packages can be highlighted on the screen, and pictures of vehicles with optional equipment, for example, can be displayed. Commercials or excerpts of commercials featuring a selected vehicle can be played. A shopper can also benefit from structuring a search query based on model, year, price and special equipment, for example, and then be instructed by a map on the display screen where to find those vehicles on the lot which satisfy the query. The AIU can, for example, provide the closest alternatives where no exact matches are available. The dealer can benefit by the records which are maintained of queries made by a shopper and those automobiles about which the shopper requested further information.

The video capacity of the interactive system can also enable shoppers to stay in touch with the rest of the world while shopping. A camera can be provided, for example, so that shoppers can request an outside view to check the weather. News bulletins, for example provided by various third parties, can also be accessed by shoppers if sources are made available. In those shopping venues which cross traditional product category boundaries, such as supermarkets or super stores that also rent videos, shoppers can request trailers, as described in connection with a shopping venue for video rentals.

The mobile apparatus 20 can be hand-held, however shoppers can select articles more easily if the apparatus is supported in a generally hands-free manner, either at all times or at least part of the time. Two alternatives are illustrated and others are possible. The apparatus can be optionally provided with a bracket 224 adapted to attach to a shopping cart, which can itself be provided with a mating adapter. Alternatively, the apparatus can be carried by a strap 290 worn around the neck or shoulder.

Voice inquiries can be initiated by speaking into a microphone 226 and audible answers to queries can be received from a speaker 228, both of which are integrally mounted on the apparatus. Alternatively, or in addition, a headset 230 having an earpiece 232, a microphone 234 and a support pad 236, can be connected by a cable 238 to a jack 240. It is expected that certain queries might seem embarrassing to shoppers, and accordingly, the headset provides an opportunity for exploiting the interactive shopping system in a private manner. As an alternative, the apparatus 20 can be contoured much like a telephone handset, and appropriate placement of the microphone and speaker 226 and 228 as shown can enable private audible communications in that fashion. In this regard, one of the function buttons, or another button not shown, or the touch screen, can be used to place a call to a person at the help desk 80 associated with the shopping venue, as shown in FIG. 1. The person at the help desk can be trained to answer questions about any aspect of the shopping venue or operation of the mobile apparatus, and thus provide a useful support function.

The apparatus can also be provided with an array 266 of output indicators, for example, light emitting. diodes.. Indicators 268 and 270 are generically labeled L1 and L2.

The precise organization and relative positions of the display screen, the button array, the indicator lights, the microphone, the speaker and the jack, if employed, is merely exemplary.

In certain kinds of shopping venues, the mobile apparatus can also be provided with a device, not shown in FIG. 2, for deactivating electronic article surveillance security tags. While this might seem to entail some risk, such a function can be useful under certain circumstances. In accordance with an inventive arrangement, certain articles can be provided with two levels or stages of security, for example represented by two security tags. A first level would monitor exits from the shopping venue to prevent an article from being stolen, whereas a second level can enable articles to be removed from a special display area for closer inspection within the shopping venue. With regard to security concerns, this function can be reserved for only qualifying shoppers and the deactivation can be transmitted to the interactive system so that the retailer is advised that a particular article has been selected for inspection by a particular shopper.

In a variation of this embodiment, for example as adapted for use by an automobile dealer, the automobile dealer can permit certain unaccompanied but approved shoppers to unlock and inspect automobiles for closer inspection anywhere on the lot. In this case, the codes for unlocking the automobiles can be stored in the supplemental data base and the mobile apparatus can be provided with the necessary code to transmit and unlock a selected automobile. Alternatively, each dealership can retain it own special code, for example, which can be programmed into each automobile by the dealer or by the factory and which can be erased from each automobile by the dealer upon sale. The system maintains a record of every automobile accessed by every shopper, for purposes of follow-up inquiries by salespersons and for purposes of accountability if automobiles are damaged.

The use of the personalized audio interface in conjunction with the graphical user interface is another aspect of the inventive arrangements. The interaction of the two interfaces is especially advantageous. The interactive system can generate an audible alert, for example, advising a shopper to observe the display screen for a graphical response to a query or a message initiated and generated by the AIU. Messages initiated and generated by the AIU can be based, for example, on an article selected and scanned for purchase or on the location of the shopper in the shopping venue.

Figure 3:
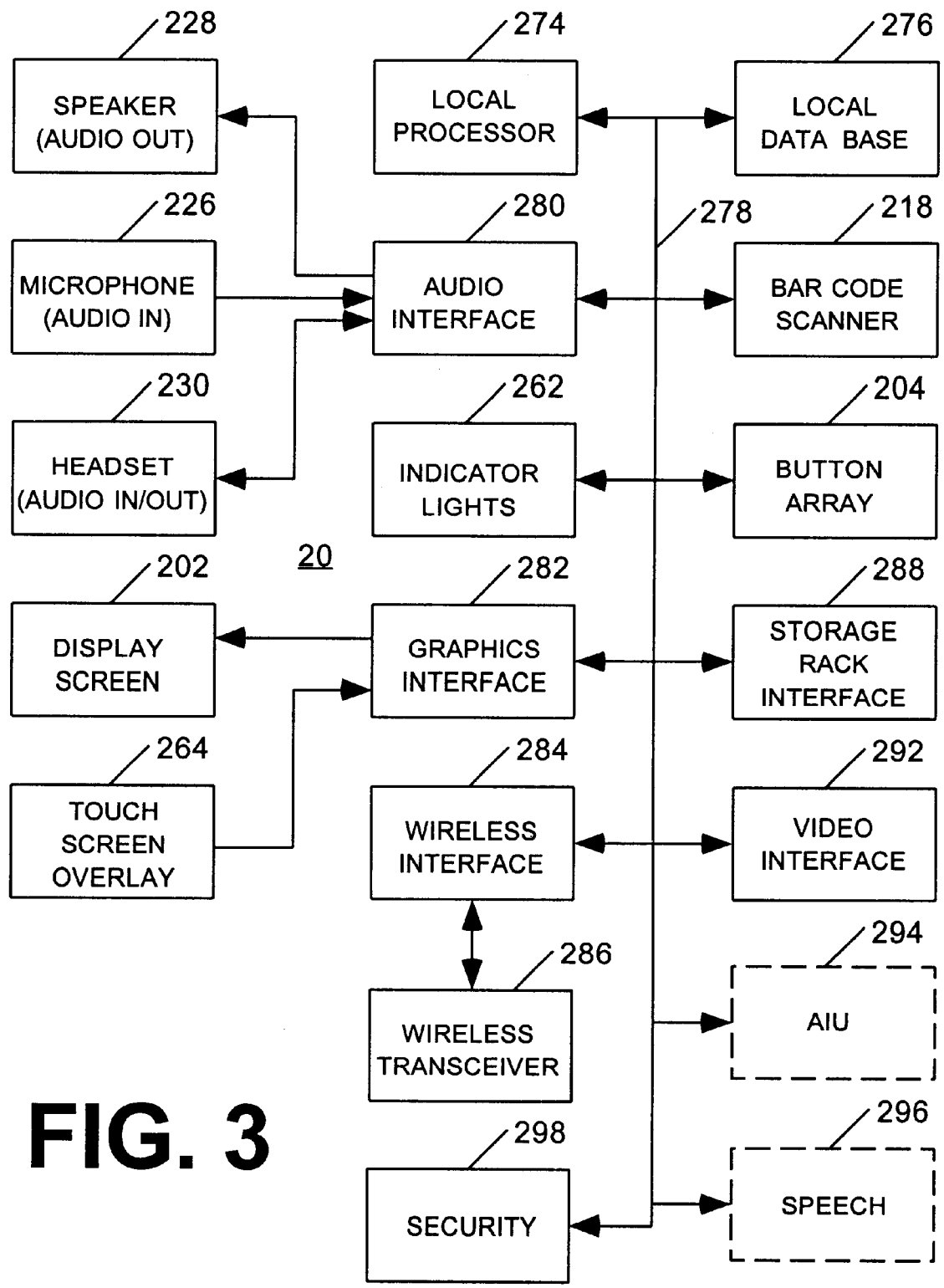
FIG. 3 is a functional block diagram of the in-aisle interactive apparatus shown in FIG. 2.

A functional block diagram of the apparatus 20 is shown in FIG. 3. The arrangement will be seen to be similar to a computer, and indeed, the apparatus can be thought of, structurally, as a special purpose portable computer with application specific user interfaces. A local processor 274, for example a RISC processor such as available from Hitachi or Toshiba, communicates over a bus 278 with a local memory data base 276 and a plurality of interfaces, each of which communicates with one or more input or output devices. An audio interface 280 communicates with the microphone 226, the speaker 228 and the headset 230. A graphics interface 282 communicates with the display screen 202 and the touch screen overlay 264. A wireless interface 284 communicates with a wireless radio frequency transceiver 286. A storage rack interface 288 communicates with the storage rack. The bar code scanner 218, button array 204 and indicator light array 262 are shown as being connected directly to the bus, but can also be provided with respective interfaces, or at least, with input and output buffers. The reception of video, if provided as a feature, can be facilitated by a video interface 292, which can include a buffer, for example video RAM, to reduce the processing load on the local processor 274. An AIU 294 is shown with dashed lines to indicate that inclusion of such a unit will eventually be practical from a cost and space point of view. A speech application 296 is shown with dashed lines to indicate that inclusion of such an application, in whole or in part, also will eventually be practical from a cost and space point of view. Each of the audio, graphics, wireless, video and bar code scanner interfaces operates in a conventional manner. The storage rack interface can, for example, be a serial or parallel port.

A security application 298 can be used to deactivate security tags and manage transmission of lock codes, as explained above. The wireless transceiver 286 can be used for this purpose as well.

The underlying structure of the interactive shopping system described in connection with FIGS. 1–3 supports an extraordinary array of shopper services available in the shopping venue, in an environment which can be managed according to an extraordinary array of marketing strategies.

The interactive shopping system provides a wide variety of functions to assist shoppers during shopping, at the point and time of article selection. The interactive shopping system can utilize, as necessary, the mobile apparatus, including the audio and graphical user interfaces, the speech application, the AIU, the information in the supplemental data base and the information in a related POS system. These functions can be divided into the following categories, which are useful for delineating the user interfaces for the shoppers: Welcome Me; Save Me; Show Me; Tell Me; Warn Me; Teach Me; and, Help Me. These functions can be initiated by respective function buttons, notwithstanding the fact that only three function buttons 212, 214 and 216 are shown in FIG. 2 for purposes of simplicity. These functions can also be implemented by using the touch screen. In this embodiment, one of the function keys can initiate a display of a list of all of the functions on the display screen and a selection can be made by touching the screen in the appropriate location. These functions can also be initiated by voice command, using the microphone 226 or the headset 230. In this case, the command is transmitted to the base station for interpretation by the AIU.

In the illustrated embodiment, some of the queries will be directed to the nutritional information in the supplemental data base. Other queries will be directed to the POS data bases, for example, finding a comparable product at a lower price. Some queries can be directed to both sources of information, for example, in a request to find an article costing not more than a certain dollar value and having a saturated fat content less than a certain amount, expressed in per cent (%) or grams. It is necessary to limit the scope of queries to a predefined set in order to keep the operation as simple as possible, considering all of the desirable features. A marketing survey will likely be necessary to determine an optimum balance of features and ease of use. The optimum balance is also likely to be different for different kinds of articles. If the interactive shopping system is implemented in a building supplies shopping venue, for example, the system can provide a first level of features and complexity for professional contractors and a second level of fewer features and greater simplicity for nonprofessionals.

FIG. 2 illustrates a few of the responses that a shopper can receive. If an 8 ounce (oz.) size of a product is scanned, for example, the shopping system can alert the shopper that a larger size is on sale, as in message 250. If a shopper has entered into a personal profile a preference for reduced fat foods, and if a tomato sauce is scanned having a certain fat content, the system can alert the shopper that a comparable brand is available with less fat, as in message 252. The shopper then has an opportunity to replace the first article with the second article, using the scanner control buttons to delete the first article. The shopper can also invoke one of the functions, such as Show Me, as shown in message 254. The shopper is then presented with a list of descriptions of available Show Me functions, for example, best price 256, least salt 258, name brand 260, store brand 262 and new product 272. The list can include button icons, shown as dots, to reinforce the need to press the screen to select the function.

In accordance with a further inventive arrangement, and with additional reference to FIG. 1, the mobile apparatus 20 can also receive wireless signals from aisle markers 310 having wireless transmitters, which can be located at the ends of each aisle 304. Most of the aisle markers 310 can be attached to the ends of the shelves 302 in an unobtrusive position, even concealed. When shelf mounting is not possible, aisle markers. can be mounted on walls or ceilings. Each aisle marker transmits the aisle number with which it is associated. The mobile apparatus can be programmed to automatically detect the aisle markers, and automatically implement a marketing initiative in response thereto. One such marketing initiative is to display for the shopper a list of all articles displayed along the aisle which are marked down as specials or for which cents-off coupons are available. An audible message can be presented to the shopper which alerts the shopper to observe the screen for a list of all such articles and the price reduction. As an alternative to automatic operation, such a feature can be enabled or disabled by the shopper. The aisle markers can also be used for other purposes, for example, to alert shoppers that articles on their shopping list can be found along that aisle. As an alternative, the interactive shopping system can be programmed to provide aisle specific information in response to a shopper query which identifies an aisle, when wireless aisle markers are not available.

Information which associates articles with particular aisles can be a part of the supplemental data base 404, as such information is not known to be available for the shopping venue. This information can be linked with coupon and special price information in the POS 60 by the AIU 406 to generate the list and audible prompt.

A particularly advantageous feature is an ability to recognize first time users and supply a tutorial which requires a minimum training time, if desired by the shopper, before shopping can commence. Thereafter, more helpful prompts can be provided than would be generated for an experienced shopper, as judged by the number of times the system has been accessed. When a first shopping excursion is concluded, a shopper can be given an option to have some or all of the tutorial repeated at the next visit to the shopping venue. Various features of the system can be appreciated from the following examples.

Examples of information which can be requested by shoppers include: the point balance in the shopper's frequent shopper account; the store aisle location of a specific product; a meal plan that provides information, such as a low-calorie dinner; a replenishment reminder of frequently purchased products which have not been purchased recently; and, the amount of money the shopper has saved this week, this month or year-to-date, using the system.

The requested information, where appropriate, can be displayed on the display screen. If the shopper asks for the lowest priced pudding which does not contain sugar, for example, the shopper can hear this information through the speaker or the headset. However, if the shopper requested a list of all of the puddings which have no sugar, regardless of price, the shopper would be audibly instructed to look at the display screen to see a list of the puddings which satisfy the query.

As the shopper is moving through the shopping venue and browsing products, the shopper can use the scanner to read the Universal Product Code (UPC) bar codes of products they are interested in, or can scan shelf labels having the product UPC bar code, and request information on these or similar or associated products.

The shopper can scan an article and then speak into the microphone or headset to request the desired information, for example, "Tell me about a lower priced item." In this situation the AIU recognizes the request for a similar item offering a lower unit price (i.e., per ounce or pound) than the scanned article, then accesses information in the POS's data base(s) for articles in the same product category with lower unit prices, converts this information from digital form to speech, and informs the shopper of lower priced items. Alternatively, the shopper can instruct the system, "Tell me about savings." The shopper is audibly advised whether the item is on sale, or whether a money-saving coupon or other promotion is being offered by the retailer or the product manufacturer for this product, or another product in the same category.

After scanning a product, the shopper can also ask for suggestions of similar products with desired characteristics. For example, the shopper can instruct the system, "Tell me about products with less salt." or "Tell me about products with no sugar." In each case the desired information can be shown on the display screen.

The shopper can also use the scanner to input information from paper coupons, for example, a coupon issued for the scanned article. The system can match the article with the coupon, and if acceptable, credit the coupon against the purchase price in the running total. If the coupon is doubled or tripled, the system can take that information into account in determining the credit.

The shopper can instruct the system to function globally concerning desired information, for example, by initiating the shopping process with a command to, "Tell me about the best buy in each new category that I scan a product." The AIU can be relied upon, for example, to relate "best buy" with lowest cost per unit.

In some cases, the "best buy" will not be the largest or least expensive article on a per unit basis, or even an article on sale. Shoppers living alone or shoppers of limited physical abilities can program the system, by way of the personal profile, to identify smaller sizes of articles, which are less likely to spoil before being used up or which are easier to carry.

The invention can also create one or more handy on-screen shopping lists. The shopper can request a reference list of the articles which the shopper purchases most frequently, or a list of all the articles purchased on a previous shopping trip made by that shopper. The list can appear on the display screen, and be redisplayed in between other function queries.

The shopper can request, just after receiving the mobile apparatus at the start of the shopping process, the shopping venue's weekly sale prices. The sale items can appear on the display screen. Selected items can be transferred to the on-screen shopping list. The shopping list can also be printed at the storage rack prior to commencing shopping.

The system can warn shoppers of unwanted results, commanding for example, "Warn me if I scan a product which contains more than 2 grams of sodium per serving." Subsequently the scan of each article will result in a comparison of the sodium content listed in the data base's nutrition information for that article with the shopper's desired warning instruction.

The shopper can request purchase suggestions, for example, "What should I buy for dinner?" The supplemental data base can be used to key such requests to diet plans, forexample those which calculate points, servings and/or exchanges. The AIU can access all of the shopper's information, purchase history, stated preferences and any demographic information provided by the shopper, such as the number of people in the household. The AIU can also access meal planning programming as well as the POS's article data base, and finally, provide the shopper with suggestions. When the unit is checked back into the storage rack, the recipe can be printed automatically for the shopper to take home. Alternatively, the shopper can ask, "I want to lose weight, what should I buy for dinner?" In this case, the recipe, as reflected in the shopping list, can be limited to foods with reduced fat content.

The interactive voice response feature of the system also enables the shopper to use speech to produce desired results. For example, when the shopper is informed that the manufacturer is offering a 50 cents ($ 0.50) off electronic coupon for a scanned item, the system can ask the shopper to say "Yes" to accept the discount, and would then add the item to the purchase total at the lower price. In another example, when the shopper is informed there is a $2.00 refund offer on purchasing two of a product, the system will ask the shopper to say "Yes" to accept the offer, and the required mail-in form can be printed out at the storage rack when the mobile apparatus is checked in.

Several operating options can be implemented. In one option, the interactive system 10 can be programmed to make a shopper's affirmative response, or a shopper's "Buy Me" command, equivalent to having scanned the article, making scanning unnecessary. In another option, the apparatus 20 can be provided with a device for deactivating electronic article surveillance tags on scanned articles.

In another example of interactive voice response that involves the AIU, the system can query the shopper for additional information before providing suggestions or information. After a request for, "What should I buy for dinner?", the system can respond with a question or ask the shopper to make a choice, for example, "How many minutes do you want to spend preparing dinner?" or "Of your favorites, seafood or Italian, which would you prefer?"

When purchase decisions are made, the shopper can select a button on the handset to add the last scanned item to the shopper's purchases. The article's price and identification can appear automatically on the display screen. The shopper can be provided with a running cost total for all selected items, as well as a running indication of savings, as a default display or upon request. This running cost total display can be part of the screen display or can be implemented by a separate display, for example at least one LCD multiple digit numerical readout display, not shown. Running cost totals can also be supplied audibly, for example after each article is scanned, or upon request.

Information is advantageously provided to the shopper only in response to shopper queries, and accordingly, is not expected to be considered intrusive. On the contrary, the information always meets a genuine need. Moreover, the information is delivered to the shopper at a time when the shopper is prepared to focus on the information and use it effectively.

When shoppers have finished shopping, the mobile apparatus 20 is returned to the storage rack 70. When the shopper places the apparatus in the rack, information which is stored in the handset can be transferred to the base station and to the POS. The printer 708 can automatically print an itemized store receipt. The printer can also print out information and offers requested during shopping, for example recipes, coupons and mail-in rebate forms. The shopper then takes the receipt to a pay station where the articles are paid for. Alternatively, receipts can be printed out at the pay stations. Either one of the mobile apparatus or the POS system can maintain the purchase totals, savings totals or other purchase related information for printing upon completion of shopping.

The interactive system can provide shoppers with an opportunity for a rapid check-out by enabling credit card or debit card payment, even automatically, depending upon the shopper's personal profile preferences. The charge slip can be printed at the rack, signed and submitted for payment.

Overall, the interactive shopping system becomes a value added intermediary between the manufacturers and the retailers managing the shopping venues. As a value added intermediary, the interactive system satisfies all of the long-felt needs of the prior art. Shoppers can benefit from enhanced shopping capabilities and can access pertinent information at the moment that such information is critically important. Manufacturers can benefit from enhanced, targeted marketing efforts, and with access to prompt feedback on the effect of the marketing efforts. The system can easily determine, for example, just how many shoppers use a particular coupon or respond to any other kind of marketing promotion. Marketing efforts which achieve their goals with less expense and less cost can result in lower costs to the shopper, thus fostering more competitive pricing. The outcome is a win-win-win situation for shoppers, retailers and manufacturers.

What is claimed is:

1. A shopping system for use in a shopping venue, comprising:
   an interactive source of supplemental information, said supplemental information related to articles available for selection by shoppers in said shopping venue;
   a plurality of interactive, mobile apparatus, remotely located from said interactive source of supplemental information, which shoppers can move throughout said shopping venue and use for transmitting queries to said interactive source of supplemental information and use for receiving responsive information transmitted from said interactive source of supplemental information, wherein at least some of said received information can be formulated to influence article selection decisions;

a speech interface operatively associated with each said apparatus; and, a speech application, said speech application including at least one of a speech recognition engine for enabling said queries to be spoken and a text-to-speech engine for enabling said transmitted supplemental information to be audibly perceived, whereby shoppers can receive information useful for evaluating said articles when making article selection decisions.

2. A shopping system for use in a shopping venue, comprising:

an interactive source of supplemental information, said supplemental information related to articles available for selection by shoppers in said shopping venue;

a plurality of interactive, mobile apparatus, remotely located from said interactive source of supplemental information, which shoppers can move throughout said shopping venue and use for transmitting queries to said interactive source of supplemental information and use for receiving responsive information transmitted from said interactive source of supplemental information, wherein at least some of said received information can be formulated to influence article selection decisions; and, at least one of:
an artificial intelligence unit for evaluating said queries and selecting information for inclusion in responses to said queries; and,
a speech application, said speech application including at least one of a speech recognition engine for enabling said queries to be spoken and a text-to-speech engine for enabling said transmitted supplemental information to be audibly perceived, whereby shoppers can receive information useful for evaluating said articles when making article selection decisions.

3. The shopping system of claim 2, wherein at least some of said supplemental information transmitted to said shoppers is responsive to said queries.

4. The system of claim 2, further comprising means for communicating with a point of sale system (POS) associated with said shopping venue.

5. The system of claim 4, wherein said information supplied to said shoppers includes at least some information from said POS system.

6. The system of claim 5, wherein at least some of said supplemental information transmitted to said shoppers is responsive to said queries.

7. The system of claim 1, comprising:
a base station remote from said plurality of interactive, mobile apparatus for housing said interactive source;
respective transceivers disposed in said apparatus and said base station for communicating data to one another; and,
respective processors for controlling said apparatus and said base station.

8. The system of claim 2, wherein at least some of said supplemental information is related to personal shopping preferences.

9. The system of claim 2, comprising at least one of:
a speech user interface for receiving spoken queries and commands and supplying audible responses; and,
a graphical user interface having a display screen and a tactilely activatable input.

10. The system of claim 9, wherein said speech user interface comprises at least one of:
a microphone and a speaker built into said apparatus; and,
a headset having a microphone and a speaker.

11. The system of claim 9, wherein:
said supplemental information includes video data; and,
said graphical user interface comprises a screen for displaying said video data.

12. The system of claim 11, wherein:
said shopping venue is associated with video cassettes; and,
said video data includes trailers for movies.

13. The system of claim 11, wherein:
said shopping venue is associated with building supplies; and,
said video data includes building projects.

14. The system of claim 11, wherein:
said shopping venue is associated with groceries; and,
said video data includes prepared foods.

15. The system of claim 11, wherein:
said shopping venue is associated with motor vehicles; and,
said video data includes motor vehicles.

16. The system of claim 11, wherein:
said shopping venue is associated with a merchandiser; and,
said video data includes merchandise.

17. The system of claim 9, wherein said tactilely activatable input comprises at least one of:
a touch display screen; and,
an array of buttons.

18. A shopping system for use in a shopping venue, comprising:

an interactive source of supplemental information, said supplemental information related to articles available for selection by shoppers in said shopping venue;

a plurality of interactive, mobile apparatus, remotely located from said interactive source of supplemental information, which shoppers can move throughout said shopping venue and use for transmitting queries to said interactive source of supplemental information and use for receiving responsive information transmitted from said interactive source of supplemental information, wherein at least some of said received information can be formulated to influence article selection decisions; and, an artificial intelligence unit for evaluating said queries and selecting information for inclusion in responses to said queries, whereby shoppers can receive information useful for evaluating said articles when making article selection decisions.

19. The system of claim 18, further comprising a speech application.

20. The system of claim 19, wherein said speech application comprises a speech recognition engine and a text-to-speech engine.

21. The system of claim 20, wherein said apparatus is adapted for selectively mounting on a shopping cart and for being carried by the shopper.

22. The system of claim 19, further comprising:
- a rack for storing a plurality of said mobile interactive apparatus, each said apparatus being adapted for said mobile use upon selective removal from said rack;
- first means enabling communication between said interactive source and said rack;
- second means enabling communication between said interactive source and a point of sale system (POS) associated with said shopping venue; and,
- third means enabling communication between said interactive source and a source of said received information formulated to influence said article selection decisions.

23. The system of claim 18, wherein said artificial intelligence unit generates a shopping list responsive to an audible customer query.

24. The system of claim 18, wherein said artificial intelligence unit generates warnings when values of data in said information supplied to said shopper for shopper-selected articles is out of a predetermined range.

25. The system of claim 18, wherein said artificial intelligence unit generates at least one of price and product advisories based on shopper-selected articles.

26. The system of claim 18, wherein said artificial intelligence unit generates a tutorial running concurrently and intermittently with selection of said articles.

27. The system of claim 26, wherein said apparatus further comprises a bar code scanner, and parts of said tutorial are initiated by scanning said articles.

28. The system of claim 18, wherein said artificial intelligence unit generates at least one of price and product advisories based on proximity to an article.

29. The system of claim 2, wherein said apparatus further comprises a bar code scanner.

30. The system of claim 2, further comprising:
- a rack for storing a plurality of said mobile interactive apparatus, each said apparatus being adapted for said mobile use upon selective removal from said rack.

31. The system of claim 30, further comprising:
- first means enabling communication between said interactive source and said rack;
- second means enabling communication between said interactive source and a point of sale system (POS) associated with said shopping venue; and,
- third means enabling communication between said interactive source and a source of said received information formulated to influence said article selection decisions.

32. The system of claim 2, further comprising a help desk station accessible by use of said apparatus in said shopping venue.

33. The system of claim 2, further comprising means enabling communication between said interactive source and a source of said received information formulated to influence said article selection decisions.

* * * * *